US009222363B2

(12) United States Patent
Cloarec

(10) Patent No.: US 9,222,363 B2
(45) Date of Patent: Dec. 29, 2015

(54) ANGULAR SECTOR OF A STATOR FOR A TURBINE ENGINE COMPRESSOR, A TURBINE ENGINE STATOR, AND A TURBINE ENGINE INCLUDING SUCH A SECTOR

(75) Inventor: Yvon Cloarec, Ecuelles (FR)

(73) Assignee: SNECMA, Paris (FR)

( * ) Notice: Subject to any disclaimer, the term of this patent is extended or adjusted under 35 U.S.C. 154(b) by 520 days.

(21) Appl. No.: 13/805,142

(22) PCT Filed: Jun. 16, 2011

(86) PCT No.: PCT/FR2011/051373
§ 371 (c)(1),
(2), (4) Date: Apr. 1, 2013

(87) PCT Pub. No.: WO2011/157957
PCT Pub. Date: Dec. 22, 2011

(65) Prior Publication Data
US 2013/0202423 A1 Aug. 8, 2013

(30) Foreign Application Priority Data

Jun. 18, 2010 (FR) ...................................... 10 54851

(51) Int. Cl.
*F01D 9/00* (2006.01)
*F01D 25/04* (2006.01)
(Continued)

(52) U.S. Cl.
CPC ............ *F01D 9/00* (2013.01); *F01D 5/225* (2013.01); *F01D 5/26* (2013.01); *F01D 9/042* (2013.01);
(Continued)

(58) Field of Classification Search
CPC ........... F01D 5/26; F01D 5/225; F01D 9/041; F01D 9/042; F01D 25/04; F01D 25/06; F01D 25/246; F01D 25/26; F04D 29/668; F04D 29/542; F05D 2260/96; F05D 2240/80

USPC .................... 415/119, 209.2–209.4, 210.1
See application file for complete search history.

(56) References Cited

U.S. PATENT DOCUMENTS 3,326,523 A * 6/1967 Bobo .......................... 415/209.3
4,621,976 A * 11/1986 Marshall et al. ............... 415/191
(Continued)

FOREIGN PATENT DOCUMENTS

EP                  1 811 131           7/2007

OTHER PUBLICATIONS

International Search Report Issued Oct. 7, 2011 in PCT/FR11/051373 Filed Jun. 16, 2011.
(Continued)

*Primary Examiner* — Thomas Denion
*Assistant Examiner* — Xiaoting Hu
(74) *Attorney, Agent, or Firm* — Oblon, McClelland, Maier & Neustadt, L.L.P.

(57) ABSTRACT

A stator angular sector for a turbine engine compressor and including: an outer shroud and an inner shroud; and at least one vane extending radially between the shrouds and connected thereto at its radial ends. At one of its axial ends the outer shroud includes a cavity opening out to the axial end and extending between a radially-inner tongue of the outer shroud to which the radially-outer end of the vane is connected and a radially-outer tongue of the outer shroud carrying a mounting mechanism for mounting the stator angular sector to a casing of the engine. An abutment-forming insert is housed at least in part in the cavity, the abutment-forming insert configured to limit radial movements of the radially-inner tongue by contact and thus to modify vibratory behavior of the radially-inner tongue.

15 Claims, 2 Drawing Sheets

(51) Int. Cl.
*F01D 5/22* (2006.01)
*F01D 25/06* (2006.01)
*F01D 5/26* (2006.01)
*F01D 25/24* (2006.01)
*F04D 29/54* (2006.01)
*F04D 29/66* (2006.01)
*F01D 9/04* (2006.01)

(52) U.S. Cl.
CPC ............... *F01D 25/04* (2013.01); *F01D 25/06* (2013.01); *F01D 25/246* (2013.01); *F04D 29/542* (2013.01); *F04D 29/668* (2013.01); *F01D 9/041* (2013.01); *F05D 2240/80* (2013.01); *F05D 2260/36* (2013.01); *F05D 2260/96* (2013.01); *Y02T 50/671* (2013.01)

(56) References Cited

U.S. PATENT DOCUMENTS

| | | | | |
|---|---|---|---|---|
| 4,721,434 | A | * | 1/1988 | Marshall et al. ............... 415/119 |
| 5,429,479 | A | * | 7/1995 | Cordier ........................ 415/209.3 |
| 5,681,142 | A | * | 10/1997 | Lewis ........................... 415/119 |
| 6,217,282 | B1 | | 4/2001 | Stanka |
| 7,635,251 | B2 | * | 12/2009 | Duesler et al. ............. 415/173.7 |
| 2004/0062652 | A1 | * | 4/2004 | Grant et al. ................ 416/220 R |
| 2004/0145251 | A1 | * | 7/2004 | Clouse et al. ................... 310/51 |
| 2005/0129520 | A1 | * | 6/2005 | Harper ....................... 416/204 R |
| 2007/0172349 | A1 | | 7/2007 | Abgrall et al. |

OTHER PUBLICATIONS

U.S. Appl. No. 13/805,211, filed Dec. 18, 2012, Cloarec.

* cited by examiner

ANGULAR SECTOR OF A STATOR FOR A TURBINE ENGINE COMPRESSOR, A TURBINE ENGINE STATOR, AND A TURBINE ENGINE INCLUDING SUCH A SECTOR

BACKGROUND OF THE INVENTION

The present invention relates to the general field of stators for a compressor in a turbine engine such as an airplane turboprop or turbojet.

A compressor in a turbine engine is made up of a plurality of compression stages, each comprising both an annular row of moving blades mounted on a shaft of the engine, and also a stator mounted on an outer annular casing of the engine.

A compressor stator may be constituted by a ring, or it may be sectorized (i.e. made up of a plurality of angular sectors connected circumferentially end to end around the longitudinal axis of the compressor). Throughout the present application, the term "stator angular sector" (or "stator sector" to be more concise) is used to mean any angular sector of a stator and presenting an angle that is less than or equal to 360°.

Each stator sector has an outer shroud and an inner shroud that are arranged coaxially one in the other, together with one (or more) vane(s) extending radially between the shrouds and connected thereto via its (their) radial ends.

By way of example, each stator angular sector is mounted in the outer annular casing of the engine by means of respective mounting tabs provided at each axial end of the outer shroud of said sector for the purpose of being engaged in corresponding annular grooves in the casing.

In operation, such a stator sector is subjected to high levels of mechanical stress, both static stress and vibrational stress.

In prior art stators in which the leading and trailing edges of the vanes are connected to portions of the outer shroud that are very thick and very stiff, these mechanical stresses are essentially taken up by the leading edge and trailing edge zones connected to the outer shroud of the stator sector. Since these connection zones are thin and not very strong, there is a risk of the leading and trailing edges being damaged or even destroyed.

Document EP 1 811 131 proposes reducing the stress on the leading and trailing edges of the vanes of stator sectors by reducing the stiffness of the connections of the stator vanes in order to optimize the transition of forces from the vanes to the outer shroud. For that purpose, the leading and/or trailing edges of the vanes are connected to zones of the outer shroud that are less rigid than the zones of the outer shroud that are connected in particular to the mounting tabs. Nevertheless, that proposal does not provide satisfactory damping of the leading and trailing edges of the vanes in the connection zones where they are connected to the outer shroud, for the purpose of effectively avoiding the vanes breaking as a result of vibration.

OBJECT AND SUMMARY OF THE INVENTION

The present invention seeks to propose a stator angular sector that is effective in limiting the mechanical stresses to which each vane of the stator sector is subjected in operation, in particular at its leading and/or trailing edges.

This object is achieved with a stator angular sector for a turbine engine compressor, the sector extending around an axis of radial symmetry and comprising: an outer shroud and an inner shroud arranged coaxially one inside the other; and at least one vane extending radially between said shrouds and connected thereto at its radial ends; in which the outer shroud has mounting means at each of its axial ends for mounting the stator angular sector to a casing of the engine; the sector being characterized in that the outer shroud includes, at at least one axial end, a cavity opening out to said axial end, said cavity extending between a radially-inner tongue of the outer shroud to which the radially-outer end of the vane is connected and a radially-outer tongue of the outer shroud carrying the mounting means for mounting the stator angular sector to a casing of the engine; and in that at least one abutment-forming insert is housed at least in part in said cavity, said abutment-forming insert being suitable for limiting the radial movements of the radially-inner tongue by contact and thus for modifying the vibratory behavior of said radially-inner tongue.

In the present application, and unless specified to the contrary, "upstream" and "downstream" are defined relative to the normal flow direction of gas (from upstream to downstream) through the engine. Furthermore, the axis of the engine is the axis of radial symmetry of the engine. The axial direction corresponds to the direction along which the axis of the engine extends, and a radial direction is a direction perpendicular to said axis. Likewise, an "axial" plane is a plane containing the axis of the engine and a "radial" plane is a plane perpendicular to said axis. Unless specified to the contrary, the adjectives and adverbs "axial", "radial", "axially", and "radially", are used with reference to the above-specified axial and radial directions. Finally, unless specified to the contrary, the adjectives "inner" and "outer" are used relative to a radial direction in such a manner that an inner portion or face (i.e. the radially-inner portion or face) of a insert is closer to the axis of the engine than is an outer face or portion of the same insert (i.e. a radially-outer face or portion).

In the present invention, the abutment-forming insert (referred to below as the "abutment insert") constitutes a rigid spacer positioned between the radially-inner and -outer tongues of the outer shroud.

In a first mode of operation, the abutment insert is clamped radially against the radially-inner tongue and/or the radially-outer tongue. In other words, at rest there exists a small amount of prestress between the abutment insert and the radially-inner tongue and/or the abutment insert and the radially-outer tongue. Nevertheless, the maximum clamping is optimized so as to enable the abutment insert to be installed and removed easily.

In another mode of operation of the invention, the rigid insert is in effortless contact with the radially-inner tongue and/or the radially-outer tongue of the outer shroud.

In yet another mode of operation, at rest, there exists a small amount of clearance between the abutment insert and the radially-inner tongue and/or between the abutment insert and the radially-outer tongue. Nevertheless, the maximum clearance is optimized to guarantee sufficient effectiveness to the system to avoid beating and the risk of wear that would result therefrom. It should be observed that the clearance serves to reduce the stiffness of the connection between the vanes and the casing of the engine.

Under all circumstances, the engagement between the abutment insert and the radially-inner tongue and/or the radially-outer tongue must be sufficiently slack to allow micro-movements of the radially-inner tongue in operation, i.e. in the presence of vibration in the stator. The assembly formed by the outer shroud and abutment insert is thus an assembly that is not completely rigid (i.e. it is not rigid). In other words, the radially-inner tongue must be capable of moving back and forth so as to give rise to successive losses of contact and restorations of contact between the abutment insert and the outer shroud. Thus, in operation, when the stator is subjected to vibration, the radially-inner tongue separates (i.e. moves radially away from the radially-outer tongue), thereby modifying the engagement between the outer shroud and the abutment insert, and then returns towards its initial position, and so on. The peening between the abutment insert and the outer shroud serves to modify the frequency of the vibratory mode, and thus avoids entry into resonance.

In accordance with the present invention, the abutment insert is thus suitable for limiting the movements of the radially-inner tongue of the outer shroud, and thus of the vane, in the radial direction, thereby keeping levels of vibration below maximum acceptable values. The provisions of the present invention thus lead to the vanes withstanding the mechanical stresses to which they are subjected more effectively and to a reduction in the risk of the vanes breaking as a result of vibratory fatigue.

The abutment-forming insert may easily be removed and/or replaced, such that the wear of the outer shroud can easily be monitored and its bearing surface(s) can easily be reconditioned.

In an embodiment of the invention, the outer shroud includes an upstream cavity opening out to the upstream end of the outer shroud and a downstream cavity opening out to the downstream end of the outer shroud, at least one abutment-forming insert being housed in at least one of said cavities. In an embodiment, at least one abutment-forming insert is housed in each of the upstream and downstream cavities of the outer shroud.

In an embodiment of the invention, the outer shroud is made as a single piece. In other words, the radially-inner tongue, the radially-outer tongue, and the middle portion that unites them constitute the same single piece. By way of example, the outer shroud may be obtained directly by casting. In another variant embodiment, it is also possible for it to be the result of a machining operation.

In another embodiment, the entire stator sector may be made as a single piece. In other words, the unit constituted by the outer shroud, the inner shroud, and the vane(s) constitutes a single-piece structure that is easier to make and stronger than a set of several parts assembled to one another.

In another embodiment, at least one of the radial ends of the abutment insert co-operates by complementary shapes with the outer shroud, whereby the said insert is held in position in the axial direction.

For example, the abutment-forming insert may be a portion of a ring that presents an oblong shape in an axial plane, with the radially-inner and -outer ends co-operating respectively with annular groove portions formed in the radially-inner tongue and in the radially-outer tongue.

In an embodiment, the abutment insert is fastened to the outer shroud via a brazed connection.

In an embodiment of the invention, the abutment insert is a ring portion with one of its radial ends co-operating with an annular groove portion of complementary shape provided in the outer shroud and its other radial end connected to the outer shroud via a brazed connection.

In another embodiment of the invention, the abutment insert is a ring portion having a base in the form of a portion of a cylinder situated facing the radially-inner tongue, and a middle portion extending radially outwards from said base to the radially-outer tongue of the outer shroud. The base forming a cylindrical portion may include at least one indentation in its radially-inner face. Such an indentation provides a saving in weight and obtains better positioning of contacts between the abutment insert and the radially-inner tongue of the outer shroud.

The invention also provides a turbine engine stator made of one or more stator angular sectors as defined above. The invention also provides a turbine engine including at least one such stator.

BRIEF DESCRIPTION OF THE DRAWINGS

Other characteristics and advantages of the invention appear on reading the following description of embodiments of the invention given by way of non-limiting illustration. The description refers to the sheets of the accompanying drawings, in which.

DETAILED DESCRIPTION OF EMBODIMENTS OF THE INVENTION

Figure 1:
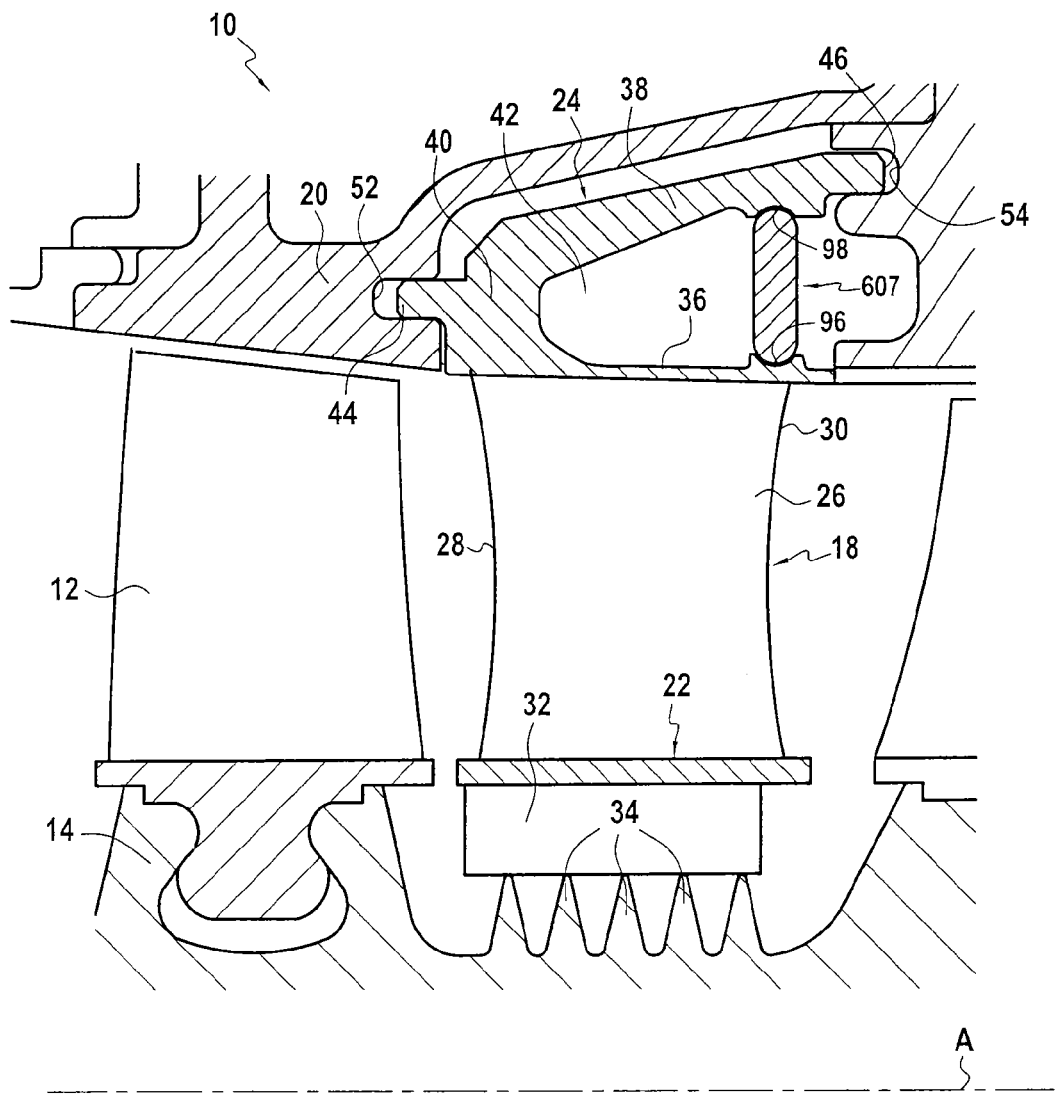
FIG. 1 is a fragmentary longitudinal section view of a turbine engine compressor including at least one stator angular sector in a first embodiment of the invention.

The compressor 10 shown diagrammatically and in part in FIG. 1 comprises a plurality of compression stages, with only two of them being shown, each stage comprising an annular row of moving blades 12 mounted on a disk 14 carried by the rotor shaft (not shown) of the turbine engine, and a stationary stator 18 carried by an outer casing 20 of the engine and constituted by one or more angular stator sectors arranged circumferentially end to end. The axis of radial symmetry of the compressor is referenced A in FIG. 1.

A stator sector 18 of the kind shown in FIG. 1 has inner and outer shrouds 22 and 24, e.g. forming portions of cylinders, extending one inside the other and connected together by one or more radial vanes 26. Each of these vanes 26 has a concave or pressure side face and a convex or suction side face, which faces are connected together at their upstream and downstream ends so as to form a leading edge 28 and a trailing edge 30 for the air that flows through the compressor 10.

The inner shroud 22 carries an abradable coating 32 on its inside surface for co-operating with radial wipers 34 carried by the rotor shaft (not shown) in order to avoid potential return flow of gas under the inner shroud 22.

In the example shown in FIG. 1, the outer shroud 24 of the stator sector 18 is made as a single piece and has a radially-inner tongue 36 to which the outer radial ends of the vanes 26 are connected, and a radially-outer tongue 38 that is coaxial around said radially-inner tongue 36, which tongues are connected together by a middle portion 40.

Still in the example shown, the middle portion 40 is situated at the upstream end of the outer shroud 24, in such a manner that the upstream ends of the radially-inner and -outer tongues 36 and 38 are attached directly thereto. A cavity 42 that is open to the downstream end of the outer shroud 36 is thus defined by the radially-inner and -outer tongues 36 and 38 (which form the walls of the cavity), and by the middle portion 40 (which constitutes the end wall of the cavity).

At each of its axial ends, the outer shroud 24 has means for mounting the stator sector 18 to the casing 20 of the engine. In FIG. 1, these mounting means comprise an upstream mounting tab 44 in the form of a portion of a cylinder extending upstream from the middle portion 40, and a downstream mounting tab 46 in the from of a portion of a cylinder formed at the end of the radially-outer tongue. Each of these mounting tabs 44 and 46 extends in an axial direction and is designed to co-operate with a corresponding groove 52, 54 in the casing 20.

In the invention, the cavity 42 of the outer shroud 24 is for receiving an abutment-forming insert (referred to below as a "abutment insert").

In the example shown in FIG. 1, the abutment insert is a ring portion 607 extending circumferentially over only a fraction or over all of the angular stator sector. As can be seen in FIG. 1, in an axial plane the ring portion 607 is oblong in shape.

By way of example, it is mounted on the angular stator sector by tangential sliding between two annular groove portions 96 and 98 formed facing each other in a radial plane, respectively in the radially-inner tongue and in the radially-outer tongue of the outer shroud.

In an axial plane, each annular groove portion presents a profile that is complementary to the profile of one of the radial ends of the ring portion 607. Mounting in this way ensures that the ring portion 607 is held axially in position within the cavity 42. Advantageously, the annular groove portions 96 and 98 may be covered in protection against the wear due to friction and to impacts with the abutment insert 607, e.g. a lubricant, a varnish, or indeed a deposit of carbide.

The abutment insert 607 is a rigid insert. In the example described, it is in effortless contact with the radially-inner tongue 36 and the radially-outer tongue 38. In other embodiments, a small amount of clearance may be provided between the abutment insert and the radially-inner tongue and/or between the abutment insert and the radially-outer tongue. In yet another embodiment, the abutment insert may be clamped a little in the radial direction between the radially-inner tongue and the radially-outer tongue.

Since the mutual engagement between the abutment insert and the radially-inner tongue is not totally rigid, the tongue can separate radially in the event of vibratory stresses. Its micromovements give rise to contact being lost and restored in succession with the abutment insert, thereby modifying the frequency of the vibratory mode and avoiding entering into resonance.

The greater the magnitude of the movements of the radially-inner tongue, the more the damping effect is improved. Furthermore, clearance (provided on manufacture or resulting from possible wear) between the outer shroud and the abutment insert is filled in more easily when the movements of the radially-inner tongue are large.

It should be observed that the radial movements of the radially-inner tongue 36 are facilitated by the small thickness of the tongue and/or by the presence of slots (not shown) in the outer shroud between the various vanes of the stator sector. These slots facilitate tilting of the radially-inner tongue by preventing the take-up of bending movements.

The abutment insert 607, which is in the form of a rigid spacer between the radially-inner and -outer tongues thus serves to oppose the vibratory mode of the vane 26. It provides a capacity for damping that limits the maximum movements of the vanes in the radial direction and thus the mechanical stresses to which they are subjected in operation.

Figure 2:
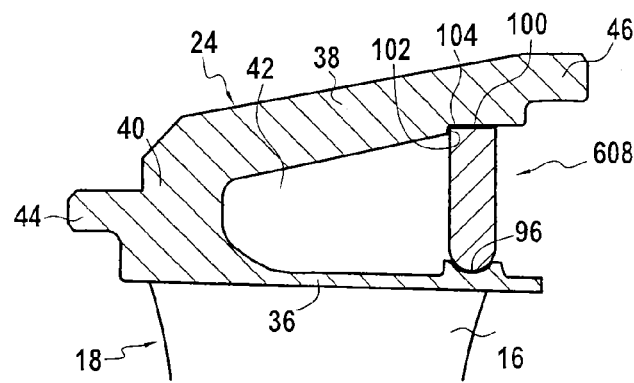
FIGS. 2 to 4 are fragmentary axial section views of angular stator sectors in other embodiments of the invention.

FIG. 2 shows another embodiment in which the abutment insert is a ring portion 608 substantially identical to that described with reference to FIG. 1, but having its radially-outer end with a plane surface 100 suitable for bearing against the inside face of the radially-outer tongue 38 and for being fastened thereto by a brazed connection (represented by a bead of brazing 104). The radially-inner end is held in an annular groove portion 96 of complementary shape formed in the radially-inner tongue 36.

As can be seen in FIG. 2, a shoulder 102 formed in the radially-outer tongue enables the ring portion 608 to be properly positioned axially before the brazing step, with the radially-outer end of the ring portion 608 coming to bear against the shoulder 102.

The ring portion is held in position inside the cavity 42 of the outer shroud 24 in this example by the brazed connection. Such a connection makes it possible to avoid using a tangential or axial retention stop for holding the abutment insert in position. The brazing operation may be performed at the same time as the brazing operation generally performed on the abradable coating 32 of the inner shroud 22. Furthermore, at the time the brazing operation is performed, the abutment insert is pressed against the tongue of the outer shroud 24 with which it is to interact. The contact pressure can be adjusted in particular by stressing the abutment insert at the time of brazing. This allows for slacker manufacturing tolerances. Finally, the outer shroud is stiffened by the brazed connection, thus enabling some of the forces coming from the vanes 26 to be transmitted to the casing, with this happening either in operation that is both normal and exceptional (surging, etc.), or else only in the event of operation that is exceptional.

Otherwise, the operation of the abutment insert 608 is identical to that described with reference to the insert 607 of FIG. 1.

Figure 3:
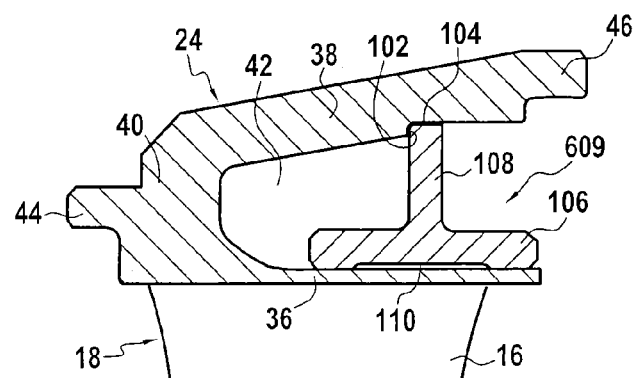

FIG. 3 shows the third embodiment of the invention in which the abutment insert is a ring portion 609 presenting a T-shaped axial section constituted by a face in the form of a portion of a cylinder 106 situated facing the outside face of the radially-inner tongue 36, and a middle portion 108 extending radially outwards approximately from the base 106 forming a portion of a cylinder, as far as the radially-outer tongue 38. In the example described, the radially-outer end of the middle portion 108 is connected to the radially-outer tongue 38 by brazing.

As in the embodiment of FIG. 2, a shoulder 102 formed in the radially-outer tongue 38 enables the ring portion 609 to be positioned axially before the brazing step.

In the example of FIG. 3, an indentation 110 is provided in the inside face of the base 106 so as to improve the positioning of contacts between the abutment insert 609 and the outer shroud 24. Otherwise, the operation of the abutment insert 609 is identical to that described with reference to the insert 607 of FIG. 1.

Figure 4:
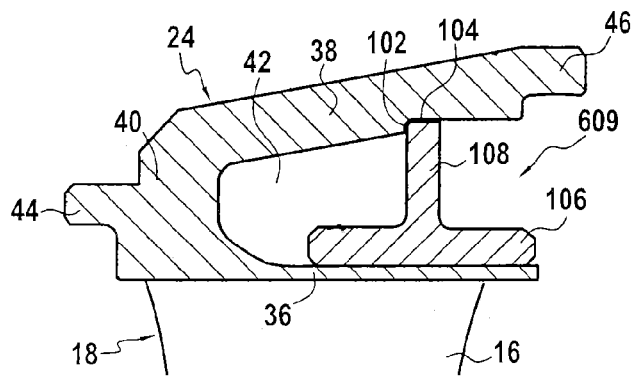

In a variant shown in FIG. 4, the inside face of the base 106 forming a portion of the cylinder need not have any indentation. This configuration is particularly suitable when, for the purpose of optimizing weight, openings are formed in the radially-outer tongue 38 of the outer shroud 24, these openings opening out into the dead cavity of the engine (i.e. the zone of the engine through which gas does not flow). The configuration of the abutment insert 609 as shown in FIG. 4 improves sealing towards the dead cavity, and also on the free side of the outer shroud, thus making it possible to avoid recirculation phenomena.

In all of the examples shown and described above, the trailing edges 30 of the vanes 26 are attached to the distal end of the radially-inner tongue 36 (in this example its downstream end that is spaced apart from the stiffer middle portion). The trailing edges 30 are thus attached to a portion of the outer shroud 24 that is not as stiff as the portion to which the leading edges 28 of the vanes are attached. This configuration is particularly suitable when the trailing edges 30 of the vanes 26 are subjected in operation to radial movements that are greater than those to which the leading edges 28 are subjected.

In contrast, it is also possible to envisage the outer shroud 24 having a middle portion at its downstream end and a cavity opening out towards its upstream end. Under such circumstances, the leading edges 28 of the vanes 26 would be attached to a portion of the outer shroud 24 (the distal end of the radially-inner tongue 36) that is less rigid than the portion to which the trailing edges 30 of the vanes 26 are connected (i.e. the end of the radially-inner tongue that is connected to the middle portion 40). This configuration is particularly suitable when the leading edges 28 of the vanes 26 are subjected in operation to radial movements that are greater than those to which the trailing edges 30 are subjected.

It is also possible to envisage that the middle portion 40 is situated at a distance from the axial ends of the outer shroud 24, and preferably substantially in the center of said shroud 24, measured along its axial direction.

Under such circumstances, the outer shroud 24 has two cavities, an upstream cavity opening out to the upstream end of the outer shroud, and a downstream cavity opening out to its downstream end. Each radial tongue of the outer shroud is thus made up of two tongue portions, an upstream portion and a downstream portion, which portions are connected together via the middle portion. The upstream cavity is defined by a portion of the upstream radially-inner tongue, a portion of the upstream radially-outer shroud, and the middle portion. In the same way, the downstream cavity is defined by a portion of the downstream radially-inner tongue, a portion of the downstream radially-outer tongue, and the middle portion.

It is possible to envisage that one or more damper-forming inserts are arranged in only one of the two cavities. It is also possible to envisage having at least one damper insert fitted in each of the cavities of the outer shroud.

This configuration is particularly suitable when the leading edges 28 and the trailing edges 30 of the vanes 26 are both subjected to high levels of vibratory activity, such that it is possible for completely decoupled vibratory modes to enter into resonance separately at the leading and trailing edges 28 and 30.

It should be observed that inserting an abutment-forming insert in a cavity of the outer shroud is facilitated when the height and the depth of the cavity are large.

In the embodiments shown, the upstream and downstream mounting means 44 and 46 for mounting the stator sector 18 on the casing 20 of the engine are thus mutually offset in the radial direction. In FIG. 1, it can be seen in particular that the junction between the downstream mounting tab 46 (i.e. the mounting tab carried by the radially-outer tongue 38 and situated beside the cavity 42) and the corresponding groove 54 in the casing has been raised.

This arrangement makes it possible to increase the height (taken in the radial direction) of the outer shroud, and thus of the cavity 42.

When the cavity is made by machining, this arrangement also makes it possible to increase the depth of the cavity 42. Because of constraints associated with machining (constraints associated in particular with the specific tooling used), the height of the cavity 42 determines its depth. The greater the height of the cavity 42, the greater it is also possible to make the depth of the cavity, and the greater the radial movements that can be acted on by the damper.

The invention claimed is:

1. A stator angular sector for a turbine engine compressor, the sector extending around an axis of radial symmetry and comprising:
   an outer shroud and an inner shroud arranged coaxially one inside the other; and
   at least one vane extending radially between the shrouds and connected thereto at its radial ends;
   wherein the outer shroud includes mounting means at each of its axial ends for mounting the stator angular sector to a casing of the engine;
   wherein the outer shroud includes, at least one axial end, a cavity opening out to the axial end, the cavity extending between a radially-inner tongue of the outer shroud to which the radially-outer end of the vane is connected and a radially-outer tongue of the outer shroud carrying the mounting means for mounting the stator angular sector to the casing of the engine; and
   wherein at least one abutment-forming insert is housed at least in part in the cavity, the abutment-forming insert configured to limit radial movements of the radially-inner tongue by contact and thus to modify vibratory behavior of the radially-inner tongue.

2. A stator angular sector according to claim 1, wherein the outer shroud includes an upstream cavity opening out to an upstream end of the outer shroud and a downstream cavity opening out to a downstream end of the outer shroud, at least one abutment-forming insert being housed in at least one of the cavities.

3. A stator angular sector according to claim 1, wherein the outer shroud is made as a single piece.

4. A stator angular sector according to claim 1, wherein clearance exists between the abutment-forming insert and the radially-inner tongue and/or between the abutment-forming insert and the radially-outer tongue of the outer shroud.

5. A stator angular sector according to claim 1, wherein the abutment-forming insert is in effortless contact with the radially-inner tongue and/or the radially-outer tongue of the outer shroud.

6. A stator angular sector according to claim 1, wherein the abutment-forming insert is clamped radially against the radially-inner tongue and/or the radially-outer tongue of the outer shroud.

7. A stator angular sector according to claim 1, wherein at least one of the radial ends of the abutment-forming insert co-operates with an annular groove portion of complementary shape provided in the outer shroud, whereby the insert is held in position in the axial direction.

8. A stator angular sector according to claim 1, wherein a radial end of the abutment-forming insert is fastened to the outer shroud by a brazed connection.

9. A stator angular sector according to claim 8, wherein the brazed connection connects the abutment-forming insert to the radially-outer tongue of the outer shroud.

10. A stator angular sector according to claim 1, wherein the abutment-forming insert is a ring portion having an oblong shape in an axial plane, and the radially-inner and outer ends of the ring portion co-operate with respective annular groove portions formed in the radially-inner tongue and in the radially-outer tongue.

11. A stator angular sector according to claim 1, wherein the abutment-forming insert is a ring portion having one of its radial ends co-operating with an annular groove portion of complementary shape provided in the outer shroud, and its other radial end connected to the outer shroud by a brazed connection.

12. A stator angular sector according to claim 1, wherein the abutment-forming insert is a ring portion having a base forming a portion of a cylinder situated facing the radially-inner tongue, and a middle portion extending radially outwards from the base to the radially-outer tongue of the outer shroud.

13. A stator angular sector according to claim 12, wherein the base forming a portion of a cylinder includes at least one indentation in its radially-inner face.

14. A turbine engine stator comprising one or more stator angular sectors according to claim 1.

15. A turbine engine including at least one stator according to claim 14.

* * * * *